(12) United States Patent
Petersson et al.

(10) Patent No.: US 8,070,901 B2
(45) Date of Patent: Dec. 6, 2011

(54) METHOD OF MANUFACTURING AN ELONGATE STRUCTURAL ELEMENT CONFIGURED FOR STIFFENING A SHELL STRUCTURE, AND A METHOD FOR MANUFACTURING A RIGID SHELL STRUCTURE INTEGRATED WITH AT LEAST ONE ELONGATE STIFFENING ELEMENT

(75) Inventors: Mikael Petersson, Linköping (SE); Björn Weidmann, Borensberg (SE); Jonny Gustavsson, Kisa (SE); Max Krogager, Linköping (SE)

(73) Assignee: SAAB AB, Linköping (SE)

( * ) Notice: Subject to any disclaimer, the term of this patent is extended or adjusted under 35 U.S.C. 154(b) by 1011 days.

(21) Appl. No.: 11/608,850

(22) Filed: Dec. 11, 2006

(65) Prior Publication Data

US 2007/0176327 A1 Aug. 2, 2007

(30) Foreign Application Priority Data

Dec. 20, 2005 (EP) .................................... 05112448

(51) Int. Cl.
*B29D 22/00* (2006.01)
(52) U.S. Cl. ........ 156/214; 156/285; 264/511; 264/512; 264/516; 264/520; 264/545; 264/546; 264/552; 264/553; 264/571; 264/260; 264/271.1; 264/272.13

(58) Field of Classification Search ................... 156/173, 156/196, 212–214, 216, 285, 381; 425/501–504; 264/510, 511, 552, 553, 571, 260, 271.1, 264/272.13, 275, 512, 516, 520, 545, 546; 244/119, 123.1, 125, 126
See application file for complete search history.

(56) References Cited

U.S. PATENT DOCUMENTS

| | | | | |
|---|---|---|---|---|
| 3,995,081 A | * | 11/1976 | Fant et al. | 428/119 |
| 4,946,526 A | * | 8/1990 | Petty-Galis et al. | 156/155 |
| 6,110,567 A | * | 8/2000 | Bird | 428/178 |
| 6,306,239 B1 | * | 10/2001 | Breuer et al. | 156/245 |
| 6,458,309 B1 | | 10/2002 | Allen et al. | |
| 2005/0230552 A1 | * | 10/2005 | Engwall et al. | 244/133 |
| 2007/0151657 A1 | * | 7/2007 | Garate Fel et al. | 156/212 |

* cited by examiner

*Primary Examiner* — Christopher Schatz
(74) *Attorney, Agent, or Firm* — Venable LLP; Eric J. Franklin

(57) ABSTRACT

A method for manufacturing an elongate stiffening element and a rigid shell structure integrated with at least one elongate stiffening element. The method includes providing a preformed, form-stable reinforcement member, which has a hat profile with two inwardly directed, opposing flange portions, covering the reinforcement member with a curable composite material to form an external hat profile having outwardly directed flanges, and integrating this assembly with either a curable or preformed shell structure of composite material.

9 Claims, 1 Drawing Sheet

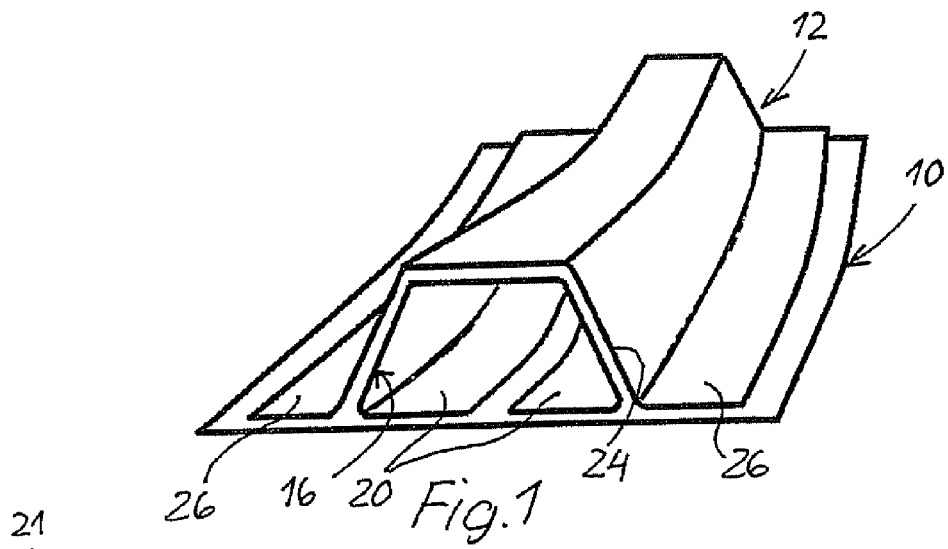
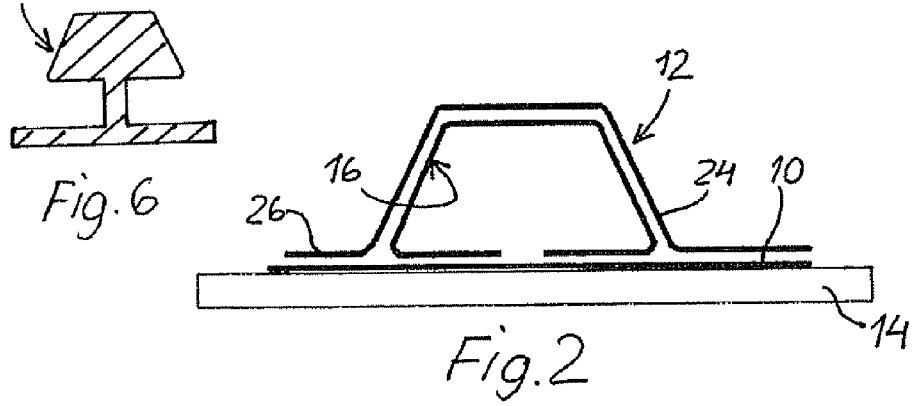
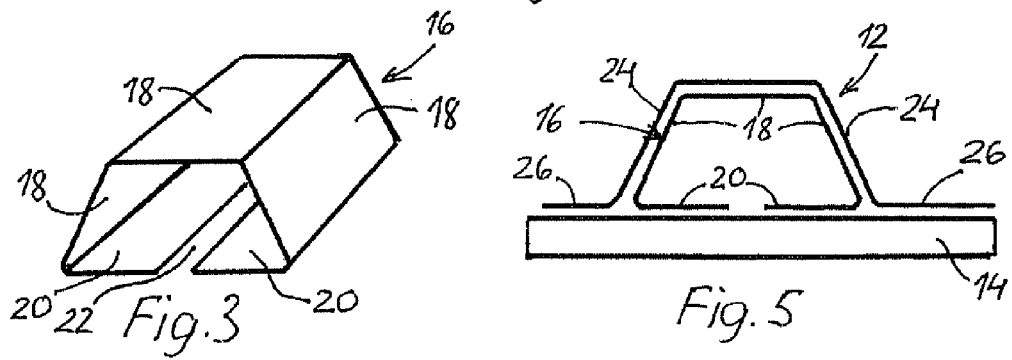
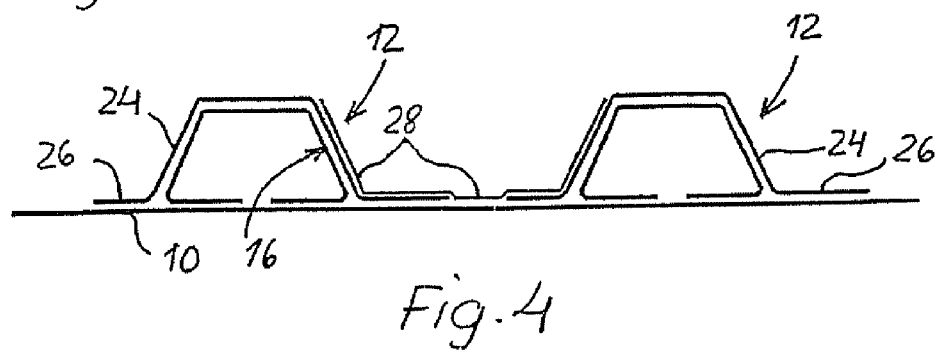

METHOD OF MANUFACTURING AN ELONGATE STRUCTURAL ELEMENT CONFIGURED FOR STIFFENING A SHELL STRUCTURE, AND A METHOD FOR MANUFACTURING A RIGID SHELL STRUCTURE INTEGRATED WITH AT LEAST ONE ELONGATE STIFFENING ELEMENT

BACKGROUND OF THE INVENTION

1. Field of the Invention

The present invention relates to a method for manufacturing an elongate structural element configured for stiffening a shell structure, and to a method for manufacturing a rigid shell structure integrated with at least one elongate stiffening element. Preferably, such methods are related to use of curable composite materials, such as fiber-reinforced composite materials, carbon fiber epoxies, etc.

2. Related Art

The manufacturing of structural elements used for the construction of vehicles, vessels and aircraft often requires high strength, light-weight composite materials containing a plurality of curable layers of fibers and metal joined by adhesive thermoset and thermoplastics. Conventionally, structural elements of composite materials are manufactured by arranging a former made of metal on a base plate and laying up laminate layers of so-called "prepeg" on the former. Then, the base plate, former and laminate material are encapsulated in one or more vacuum bags before inserting the assembly into a pressure tank in order to increase the pressure acting on the composite material in the tank and to cure the structural element. The curing of the structural element may also take place in a so-called autoclave, or possibly in an oven.

Previously known methods of manufacturing structural elements of more complex shapes, for example curved elongate hat profiles configured for stiffening a shell structure, often require destructible formers (e.g. so-called "Stabilam") in order to be able to remove the finished element therefrom.

For example, the EP application No. 05002075.9, not published before the present application, describes use of a water-soluble former when manufacturing an elongate hat or omega-profiled structural elements, such as stiffeners, spars, fittings or the like. This involves further manufacturing steps. Also, in such elongate hat or omega-shaped profiles high shearing and splitting stresses are often exerted on the outwardly directed flanges of the finished structural element which calls for a more rigid structure.

U.S. Pat. No. 6,458,309 B1 discloses a method for fabrication of composite aerostructure articles wherein an elongated hollow mandrel made of a pre-stiffened, flexible, spirally arranged tape is used as a former for hat-profiled reinforcement sections of a shell structure. However, although the former may remain in the finished article as a "fly-away tool", a spring-like flexibility of the hollow mandrel makes it not able to take up any greater loads, especially not in the longitudinal direction of the hat profile.

SUMMARY OF THE INVENTION

It is an object of the present invention to present a method which makes it possible to manufacture elongate structural elements of complex configurations configured for stiffening a shell structure, which elements have improved strength to withstand high stresses and loads acting on the flange joints between the profiles and the shell structure, both in a longitudinal and a transverse direction of the profiles.

Another object of the invention is to suggest a method which makes it possible to manufacture such elongate structural elements of complex configurations without using a destructible former.

To this end, according to one aspect of the invention, in order to form a preformed, cured, integrated stiffening element for attachment to a predetermined surface of a shell structure the method comprises the steps of:

placing on a base-forming body having a surface corresponding to a shell structure surface, to which the structural element is to be attached, a preformed form-stable, load-carrying, elongate reinforcement member, said reinforcement member having a web portion with a surface configuration corresponding to an inner surface of a web portion of the structural element to be manufactured, and two flange portions directed inwardly to oppose each other while engaging an opposite surface of the base-forming body, applying an elongate hat profile of uncured composite material over the preformed reinforcement member, so that a web portion of the hat profile covers the web portion of the reinforcement member, and two outwardly directed flange portions of the hat profile engage the opposite surface of the base-forming body, and curing the elongate hat profile together with the preformed reinforcement member so as to form a preformed, cured, integrated structural element for attachment to a predetermined surface of a shell structure.

By using a preformed form-stable elongate reinforcement member having two flange portions directed inwardly to oppose each other while engaging an opposite surface of the base-forming body, and applying an elongate hat profile of uncured composite material over the preformed reinforcement member, so that a web portion of the hat profile covers the web portion of the reinforcement member, and two outwardly directed flange portions of the hat profile engage the opposite surface of the base-forming body, it is possible to integrate the form-stable reinforcement member, as a load-carrying element within the assembled structure and to obtain, after curing the entire structure assembly, an elongate structural element having both outwardly and inwardly directed flanges with thus a doubled ability of taking up stresses tending to split or tear apart the structural element from a shell structure to which it is adapted to be attached, as well as taking up greater loads in the longitudinal direction of the assembly. Preferably, the form-stable reinforcement member is preformed of a multilayer composite sheet material and precured.

The present invention also relates to the manufacturing of a rigid shell structure integrated with at least one elongate stiffening element produced in accordance with the method set forth above. In order to obtain such a stiffened integral shell structure one, or preferably a plurality of mutually spaced, preformed elongate stiffening elements are either placed on an uncured shell structure of a composite material and cured together therewith, or placed on a preformed shell and bonded thereto in a suitable manner.

Further features of the invention will be described more in detail below and defined in the appended claims with reference to the accompanying drawings.

BRIEF DESCRIPTION OF THE DRAWING

FIG. 1 is a schematic perspective view of a section of a curved shell structure integrated with an elongate, curved structural profile element;

FIG. 2 is a schematic cross-section of the assembly in FIG. 1 placed on a base-forming body;

FIG. 3 is a schematic cross-section of a form-stable reinforcement member used in the manufacturing of the assembly in FIG. 1;

FIG. 4 is a schematic cross-section of a shell structure integrated with two elongate structural profile elements with an intermediate draping layer;

FIG. 5 is a schematic cross-sectional view similar to FIG. 2 but illustrates separate forming of an elongate stiffening element directly on a base-forming body; and FIG. 6 is a cross section of a rigid tool bar for forming the form stable reinforcement member.

DETAILED DESCRIPTION OF PREFERRED EMBODIMENTS

In FIG. 1, 10 generally denotes a section of a single-curved shell structure integrated with an elongate, correspondingly single-curved structural profile element 12. For example, the shell structure 10 reinforced with at least one structural profile element 12 may constitute a structural article of a vehicle or aircraft, such as a door or hatch. The invention may be applied to double-curved shell structures as well.

As seen in FIG. 2, in a preferred embodiment of the method of the invention, the shell structure 10 is preferably made up of a plurality of layers of fiber-reinforced composite material, such as "prepeg", carbon fiber epoxy, or any other suitable thermosetting plastic material, which in an uncured state are laid upon a rigid base-forming plate 14 having the same surface curvature as the outside surface of the article to be manufactured. In order to form a strong, elongate hat profile element 12 to be integrated with the shell structure 10, a separate preformed, form-stable reinforcement member 16 (FIG. 3) having a web portion 18 and two inwardly directed flange portions 20 is laid upon the uncured layers of fiber-reinforced composite material forming the shell structure 10. The reinforcement member 16 may be preformed by applying a plurality of layers of uncured fiber-reinforced composite material ("prepeg") over a rigid tool bar 21 (see FIG. 6) having a surface configuration corresponding to the inner profile surface of the reinforcement member 16. A gap 22 between the flanges 20 of the reinforcement member 16 will allow for an easy bending or pull-off of the reinforcement member 16 from the tool bar after having cured the same in a suitable manner on the tool bar. This is also the case when the tool bar is curved in the longitudinal direction.

Several layers of uncured composite material 24, e.g. "prepeg", are then laid over the elongate hat-shaped reinforcement member 16 to form an external hat profile having two outwardly directed flanges 26. Furthermore, when more than one structural profile element 12 are to be applied to the shell structure 10, such as shown in FIG. 4, a plurality of draping sheets 28 of uncured composite material are laid over and between the adjacent hat profile elements 12 so as to form a further layer which reduces stresses acting to separate the profile elements 12 from the shell structure 10. Then, the whole assembly is cured in a suitable manner known per se, including e.g. a so-called bagging-technique.

Thus, according to the method of the present invention, a preformed form-stable, load-carrying reinforcement member 16 also serves as a form tool (a so-called "fly-away-tool") which may remain in the finished product as a rigid load-carrying component thereof. This will result in an elongate structural element having both outwardly and inwardly directed flanges 26 and 20, respectively, which, in comparison with a hat profile lacking inwardly directed flanges, will offer a doubled ability of taking up stresses tending to split or tear apart the structural element from a shell structure to which it is adapted to be attached, as well as taking up greater loads in the longitudinal direction of the hat profiled stiffening element. Elongate hat profile elements to be integrated with a shell structure and having curved or other complex shapes may here be produced without using destructible formers, such as "Stabilam" or "Flexact".

As shown in FIG. 5, according to a second aspect of the present invention, it is possible to first preform the proper elongate hat profile elements 12 on a base-forming plate 14 and then attach them to a finished shell structure 10 of any form-stable, suitable material. This may include application of an adhesive on either one of mutual contact surfaces of the stiffening profile element and the preformed shell structure, or a heat welding process.

Although in FIG. 1 the shell structure 10 is shown as a single-curved article, it is of course equally well possible to form a flat shell structure 10 and a flat stiffening element 12 on a correspondingly flat base-forming body 14.

What is claimed is:

1. A method for manufacturing an elongate structural element configured for stiffening a shell structure, said method comprising:

preforming a load-carrying elongate reinforcement member of a multilayer composite sheet material on an elongate rigid form tool, precuring the reinforcement member to make it form-stable removing the precured reinforcement member from the form tool, placing the precured reinforcement member on a base-forming body having a surface corresponding to a shell structure surface, to which the structural element is to be attached, said precured reinforcement member having a web portion with a surface configuration corresponding to an inner surface of a web portion of the structural element to be manufactured, and two flange portions directed inwardly to oppose each other while engaging an opposite surface of the base-forming body, applying an elongate hat profile of uncured composite material over the precured reinforcement member, so that a web portion of the hat profile covers the web portion of the precured reinforcement member, and two outwardly directed flange portions of the hat profile engage the opposite surface of the base-forming body, and curing the elongate hat profile together with the precured reinforcement member so as to form a preformed, cured, integrated elongate structural element for attachment to a predetermined surface of a shell structure.

2. The method according to claim 1, further comprising:

separately preforming said elongate hat profile before applying the same over the preformed reinforcement member.

3. The method according to claim 1, wherein the base-forming body, on which the structural element is to be assembled and formed, is single-curved in a longitudinal direction thereof.

4. The method according to claim 3, wherein the preformed reinforcement member is provided with a gap between its opposing, inwardly directed flanges.

5. A method for manufacturing a rigid shell structure with at least one elongate stiffening element, the method comprising:

preforming a load-carrying elongate reinforcement member of a multilayer composite sheet material on an elongate rigid form tool, precuring the reinforcement member to make it form-stable removing the precured reinforcement member from the form tool, placing on a base-forming body having a surface corresponding to a predetermined shell structure surface, to which the stiffening element is to be attached, the precured reinforcement member, said precured reinforcement member having a web portion with a surface configuration corresponding to an inner surface of a web portion of the stiffening element, and two flange portions directed inwardly to oppose each other while engaging an opposite surface of the base-forming body, applying an elongate hat profile of uncured composite material over the precured reinforcement member, so that a web portion of the hat profile covers the web portion of the precured reinforcement member, and two outwardly directed flange portions of the hat profile engage the opposite surface of the base-forming body, curing the elongate hat profile together with the precured reinforcement member so as to form a preformed, cured, integrated elongate stiffening element, and attaching the at least one, preformed stiffing element to a predetermined surface of a preformed shell structure.

6. The method according to claim 5, wherein the preformed shell structure includes a cured composite material.

7. The method according to claim 5, wherein attaching the at least one preformed elongate stiffening element to the preformed shell structure includes application of an adhesive on either one of mutual contact surfaces of the stiffening element and the preformed shell structure.

8. The method according to claim 5, wherein the preformed reinforcement member used has a trapezoid cross-sectional profile.

9. The method according to claim 5, wherein the integrated elongate stiffening element has an omega-shaped cross-sectional profile.

* * * * *